Feb. 5, 1952  J. G. DONALDSON  2,584,436
VALVE DEVICE
Filed April 15, 1946
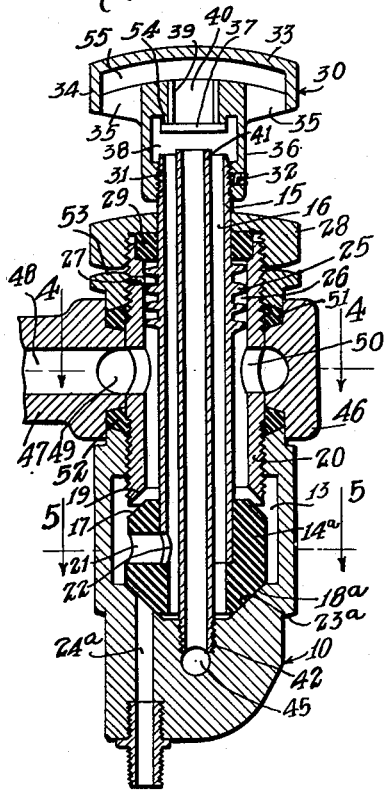
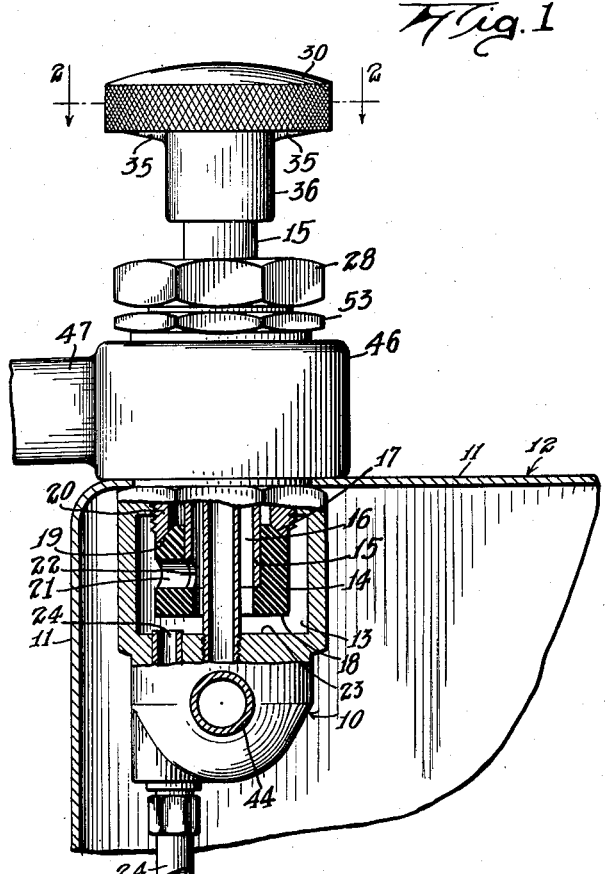
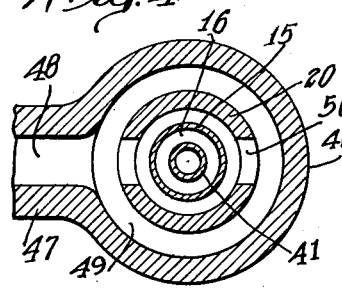
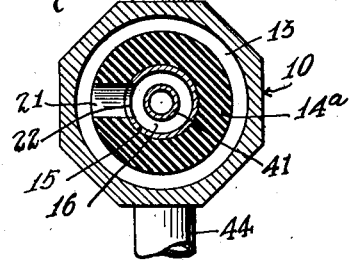
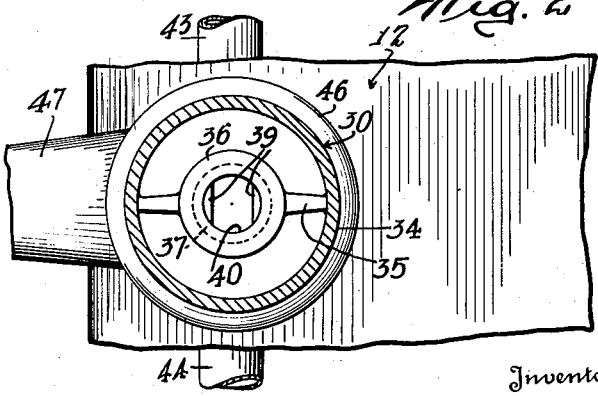
Inventor
Joseph G. Donaldson
By Lyon & Lyon
Attorneys Patented Feb. 5, 1952

2,584,436

UNITED STATES PATENT OFFICE 2,584,436

VALVE DEVICE

Joseph G. Donaldson, Los Angeles, Calif., assignor of one-half to A. S. Van Denburgh, Los Angeles, Calif.

Application April 15, 1946, Serial No. 662,312

10 Claims. (Cl. 277—55)

This invention relates to valve devices and is particularly directed to a fluid valve having a novel form of suction breaker incorporated therein.

The principal object of this invention is to provide a valve assembly having novel means for preventing reverse flow through the valve.

Another object is to provide a diversion valve for water or other liquid having a hollow stem through which such liquid is introduced and having a suction breaker means associated with the upper end of such hollow stem.

Another object is to provide a valve of this type having a movable valve element provided with axially spaced sealing surfaces and a hollow valve stem for actuating the movable element, and for delivery of liquid from the interior of the stem through a lateral port in the valve element located between the sealing surfaces.

Another object is to provide a valve assembly adapted to be partially inserted into a closed container for liquid, and in which assembly suction breaker means are provided at a point above the highest level of liquid within the container.

Other objects and advantages will appear hereinafter.

Figure 1 is a side elevation partly in section showing the preferred embodiment of my invention.

Figure 2 is a sectional plan view taken substantially on the line 2—2 as shown in Figure 1.

Figure 3 is a sectional plan view of a valve assembly similar to that shown in Figure 1, but incorporating a modified form of valve element.

Figure 4 is a sectional plan view taken substantially on the line 4—4 as shown in Figure 3.

Figure 5 is a sectional plan view taken substantially on the line 5—5 as shown in Figure 3.

Referring to the drawings, a valve housing 10 extends within the walls 11 of a fluid container generally designated 12. The housing 10 is provided with a central valve chamber 13 in which a movable valve element 14 is positioned. The valve element 14 is bonded to the lower end of a tubular stem 15 having a central passageway 16 extending therethrough. The valve element 14, as shown in Figure 1, is provided with an upper conical sealing surface 17 and a lower plane sealing surface 18 axially spaced therefrom. The surface 17 is adapted to engage the corresponding conical seat 19 formed at the lower end of the sleeve 20, which is threadedly received within the housing 10.

A lateral port 21 in the element 14 aligns with a similar port 22 extending through the wall of the hollow stem 15, thereby establishing communication between the valve chamber 13 and the passageway 16 within the stem 15. The sealing surface 18 is adapted to engage the lower end 23 of the chamber 13 to form a seal, and it will be apparent that in such lower position the surface 18 prevents discharge of fluid outwardly through the outlet 24.

The construction illustrated in Figure 3 is substantially identical to the construction just described in connection with Figure 1 except that the valve element 14a has a lower conical sealing surface 18a and engages a conical surface 23a at the lower end of the chamber 13. When the surfaces 18a and 23a are in sealing engagement, the outlet 24a is blocked and, hence, discharge through such outlet is prevented.

The hollow stem 15 is provided with a helical threaded section 25 on its outer surface and the helical groove 26 provided by this section is engaged by the stationary pin 27 mounted within the sleeve 20. A result of this construction is that when the stem 15 is turned, the cooperative engagement between the pin 27 and groove 26 results in axially moving the stem 15 relative to the housing 10 and sleeve 20.

A gland nut 28 is threadedly connected to the upper end of the sleeve 20 and serves to compress a packing ring 29 to prevent leakage at the point where the stem 15 passes through the nut 28. The valve handle 30, of any convenient form, is connected to the projecting end of the hollow stem 15 by any convenient means, such as threads 31 and set screw 32. The handle 30 is preferably formed as a substantially hollow bonnet 33 having a depending cylindrical skirt 34. Two or more ribs 35 connect the hub portion 36 of the handle with the bonnet skirt 34. A valve disc 37 is mounted within the recess 38 formed within the hub 36. The disc 37 carries a pair of upwardly extending guides 39 which are slidably received within the bore 40 of the handle.

Means are provided for introducing fluid under pressure into the recess 38 within the handle 30 and, as shown in the drawings, this means includes the substantially upstanding tube 41 which extends axially through the central passageway 16 within the stem 15. The lower end of the tube 41 is threadedly secured at 42 within the valve housing 10 and is in communication with the lateral inlets 43 and 44 by way of the central opening 45. The upper end of the tube 41 extends beyond the upper end of the hollow stem 15.

Encircling the sleeve 20 is the hub section 46 provided on a swing spout 47. The outlet 48 in the swing spout communicates with the annular space 49 within the sleeve 20 by way of lateral ports 50 formed through the wall of the sleeve 20. Spaced packing means 51 and 52 are provided for sealing the joint between the sleeve 20 and the swing spout hub 46 against leakage and a gland ring 53 is threadedly connected to the sleeve 20 for compressing both packing rings 51 and 52.

In operation, fluid under pressure may be admitted through inlet pipes 43 and 44. The control valves for such inlet pipes are not shown. Such fluid under pressure, for example, water, is admitted into the lower end of the tube 41 through the opening 45. Pressure of the water within the recess 38 raises the valve disc 37 into contact with the annular seat 54 encircling the lower end of the bore 40 within the handle 30. Leakage of water outwardly through the space 55 under the bonnet 33 of the handle 30 is thereby prevented and the water is forced down the annulus or passageway 16 within the hollow stem 15 exteriorly of the central tube 41.

If the valve element 14a is in the position illustrated in Figure 3, the water flowing downwardly through the passageway 16 passes outwardly through the lateral ports 21, 22 into the valve chamber 13 within the valve housing 10. Since the port 24a is closed off and since the sealing surfaces 17 and 19 are axially separated, the water flows upwardly into the space 49 within the sleeve 20 and thus outwardly through the ports 50 into the outlet 48 in the swing spout 47.

If the handle 30 is turned to raise the hollow stem 15 by reason of the interengaging pin 27 and helix groove 26, the sealing surface 17 will be brought into sealing contact with the conical seat 19 at the lower end of the sleeve 20. Such upward movement of the valve element 14a moves the surfaces 18a and 23a out of engagement with the result that water within the valve chamber 13 is diverted downwardly through the outlet 24a.

Similarly, in the valve construction illustrated in Figure 1, water within the passageway 16 passes outwardly through the ports 21, 22 into the chamber 13 and is directed into the space 49 leading to the swing spout, or is directed downwardly through the outlet 24 depending on whether the surfaces 17 and 19 are in sealing engagement or whether the surfaces 18 and 23 are in sealing engagement.

In the event that a suction should occur within the inlet 45, pressure in the recess 34 would immediately fall below atmospheric pressure with the result that the valve disc 37 would be forced downwardly by air pressure into sealing engagement with the upper end of the central stationary tube 41. Continuing suction in the inlet 45 therefor does not siphon water in a reverse direction through the outlets 48 and 24a, but on the contrary, the passageway 16 is immediately subjected to atmospheric pressure only by the separation of the valve disc 37 from the seat 54. Even if the sealing contact between the disc 37 and the upper end of the tube 41 is not perfect, the continuing suction within the tube 41 will not siphon water from the passageway 16, but instead will draw air in through the hollow handle 30. The water supply mains are, therefore, protected against influx of foreign matter in the event that back flow conditions should occur.

Having fully described my invention, it is to be understood that I do not wish to be limited to the details herein set forth, but my invention is of the full scope of the appended claims.

I claim:

1. A valve assembly having a fluid inlet and a fluid outlet communicating with a valve chamber, a valve seat therein, a movable valve element adapted to contact said seat to form a seal, actuating means for moving the valve element with respect to said seat comprising an upwardly extending valve member having a longitudinal passageway therein, means for establishing communication between the longitudinal passageway and the valve chamber, means for introducing fluid into the upper end of the longitudinal passage including a relatively stationary inlet tube within the passage, a port leading to atmosphere from a location near the upper end of said member, the upper end of the tube being below the port, walls forming a recess connecting the tube and the port, an auxiliary valve mounted for vertical movement within the recess actuated by pressure of fluid within the inlet tube normally adapted to close the port, said auxiliary valve being adapted to open the port to establish communication from the inlet tube to atmosphere through the port upon failure of pressure of the fluid, and means for introducing fluid into the lower end of the inlet tube.

2. A valve assembly having a fluid inlet and a fluid outlet communicating with a valve chamber, a valve seat therein, a movable valve element adapted to contact said seat to form a seal, actuating means for moving the valve element with respect to said seat comprising an upwardly extending valve member having a longitudinal passageway therein, means for establishing communication between the longitudinal passageway and the valve chamber, means for introducing fluid into the upper end of the longitudinal passage including a relatively stationary inlet tube within the passage, a port leading to atmosphere from a location near the upper end of said member, an auxiliary valve actuated by pressure of fluid within the inlet tube adapted to close the port, said auxiliary valve being adapted to seat on the upper end of said inlet tube to prevent reverse flow therethrough upon failure of pressure of the fluid, and means for introducing fluid into the lower end of the inlet tube.

3. A diversion valve assembly having a fluid inlet and a first and second outlet, the combination of a valve chamber having spaced valve seats therein, a movable valve element adapted to contact either of said seats to form a seal, passage means cooperating with said spaced valve seats whereby sealing contact of the valve element with either of said seats acts to prevent discharge of fluid through a corresponding outlet, actuating means for moving the valve element from one seat to the other comprising an upwardly extending valve member having a longitudinal passageway therein, means for establishing communication between the longitudinal passageway and the valve chamber at a location between said spaced valve seats, means for introducing fluid into the upper end of the longitudinal passage including a relatively stationary inlet tube within the passage, a port leading to atmosphere from a location near the upper end of said member, an auxiliary valve actuated by pressure of fluid within the inlet tube adapted to close the port, said auxiliary valve being adapted to seat on the upper end of said inlet tube to prevent reverse flow therethrough upon failure of pressure of the fluid, and means for introducing fluid into the lower end of the inlet tube.

4. A diversion valve assembly having a fluid inlet and a first and second outlet, the combination of a valve chamber having spaced valve seats therein, a movable valve element adapted to contact either of said seats to form a seal, passage means cooperating with said spaced valve seats whereby sealing contact of the valve element with either of said seats acts to prevent discharge of fluid through a corresponding outlet, actuating means for moving the valve element from one seat to the other comprising an upwardly extending valve member having a longitudinal passageway therein, means for establishing communication between the longitudinal passageway and the valve chamber at a location between said spaced valve seats, means for introducing fluid into the upper end of the longitudinal passage including a relatively stationary inlet tube within the passage, a port leading to atmosphere from a location near the upper end of said member, the upper end of the tube being below the port, walls forming a recess connecting the tube and the port, an auxiliary valve mounted for vertical movement within the recess actuated by pressure of fluid within the inlet tube normally adapted to close the port, said auxiliary valve being adapted to open the port to establish communication from the inlet tube to atmosphere through the port upon failure of pressure of the fluid, and means for introducing fluid into the lower end of the inlet tube.

5. A valve assembly having a fluid inlet and fluid outlet communicating with a valve chamber, a movable element within said chamber selectively operable to prevent flow through the fluid outlet, actuating means for moving said element in the valve chamber comprising a longitudinally extending stem having a passageway therein, means for establishing communication between the longitudinal passageway and the valve chamber, means at the upper end of the stem whereby the stem may be manually operated, said means including a port establishing communication from the passageway to the atmosphere, means for introducing fluid into the passageway at a point adjacent to said manually operated means, including a relatively stationary inlet tube positioned within the passage, an auxiliary valve actuated by pressure of fluid within the inlet tube normally adapted to close the port, said auxiliary valve being adapted to open the port and to seat on the end of said inlet tube adjacent said manually operated means to prevent reverse flow through the tube upon failure of pressure of the fluid, and means for introducing fluid into the lower end of the inlet tube.

6. In a valve assembly, the combination of a valve housing having a chamber therein, a fluid outlet leading from said chamber, a movable valve element in the chamber selectively operable to prevent discharge of fluid through said outlet, a valve stem secured to said valve element and projecting from said housing, a valve handle on the projecting end of said stem, a passageway extending longitudinally of the valve stem, means establishing communication between said valve chamber and said passageway, port means in the valve handle establishing communication between atmosphere and said passageway, pressure operated valve means associated with the handle normally adapted to prevent fluid discharge through said port means, means for introducing fluid under pressure into the upper end of said passageway including a stationary tube secured relative to the housing and positioned within the passageway, said pressure operated valve means being adapted to seat on the upper end of said inlet tube to prevent reverse flow therethrough upon failure of fluid pressure therein.

7. A movable element for a valve assembly comprising a hollow stem, a valve element secured to the lower end of the stem, a valve handle removably secured to the upper end of the stem, port means in the handle communicating with the atmosphere and the interior of the stem, and a pressure responsive auxiliary valve positioned in the handle normally acting to block said port means.

8. A movable element for a valve assembly comprising a hollow stem, a valve element having axially spaced sealing surfaces and secured to the lower end of the stem and a lateral opening through the valve element between said sealing surfaces communicating with the interior of the stem, a valve handle removably secured to the upper end of the stem, port means in the handle communicating with the atmosphere and the interior of the stem, and a pressure responsive auxiliary valve positioned in the handle normally acting to block said port means.

9. In a valve assembly, the combination of a selectively operable valve element adapted to divert a fluid from an inlet tube to alternative outlets, said valve element having a port leading to atmosphere, an auxiliary valve carried on said element and normally maintained by pressure of the fluid, said auxiliary valve being adapted to seat on the end of said inlet tube upon failure of fluid pressure whereby reverse flow of fluid through said inlet tube is prevented.

10. In a valve assembly, the combination of a fluid inlet tube and a fluid outlet, a selectively operable valve element interposed between the inlet and the outlet and adapted to regulate flow of fluid therethrough, said valve element having a port leading to atmosphere, an auxiliary valve carried on said element and normally maintained in a position to close said port by pressure of the fluid flowing from the inlet tube to the outlet, said auxiliary valve being adapted to seat on the end of said inlet tube upon failure of fluid pressure whereby reverse flow of fluid from the outlet to the inlet tube is prevented.

JOSEPH G. DONALDSON.

REFERENCES CITED

The following references are of record in the file of this patent:

UNITED STATES PATENTS

| Number | Name | Date |
|--------|------|------|
| 685,169 | Paul | Oct. 22, 1901 |